United States Patent
Kuwayama (10) Patent No.: US 12,214,682 B2
(45) Date of Patent: Feb. 4, 2025

(54) TIRE/WHEEL ASSEMBLY AND TIRE

(71) Applicant: BRIDGESTONE CORPORATION, Tokyo (JP)

(72) Inventor: Isao Kuwayama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 402 days.

(21) Appl. No.: 17/628,568

(22) PCT Filed: Jul. 22, 2020

(86) PCT No.: PCT/JP2020/028512
§ 371 (c)(1),
(2) Date: Jan. 20, 2022

(87) PCT Pub. No.: WO2021/015258
PCT Pub. Date: Jan. 28, 2021

(65) Prior Publication Data
US 2022/0258623 A1    Aug. 18, 2022

(30) Foreign Application Priority Data

Jul. 25, 2019  (JP) .................. 2019-137244

(51) Int. Cl.
*B60L 53/12*    (2019.01)
*B60B 21/12*    (2006.01)
(Continued)

(52) U.S. Cl.
CPC .............. *B60L 53/12* (2019.02); *B60B 21/12* (2013.01); *B60C 13/00* (2013.01); *H02J 50/10* (2016.02);
(Continued)

(58) Field of Classification Search
CPC .......... B60L 53/12; B60L 53/38; H02J 50/10; B60B 21/12; B60B 2900/921;
(Continued)

(56) References Cited

U.S. PATENT DOCUMENTS 3,504,724 A *  4/1970  Sperberg ................. B60C 9/20
                                                    152/530
6,471,020 B1 * 10/2002  Hernandez .............. B60L 53/14
                                                    191/2
(Continued)

FOREIGN PATENT DOCUMENTS

CN    103889739 A    6/2014
CN    106143185 A   11/2016
(Continued)

OTHER PUBLICATIONS

Feb. 29, 2024, search result of Office Action issued by the China National Intellectual Property Administration in the corresponding Chinese Patent Application No. 202080052308.4.
(Continued)

*Primary Examiner* — Kip T Kotter
(74) *Attorney, Agent, or Firm* — KENJA IP LAW PC (57) ABSTRACT

A tire/wheel assembly includes a wheel including a disk and a rim, the wheel having a power reception device attached to an outer peripheral surface of the rim to receive electric power supplied wirelessly from farther outward in a radial direction of the wheel than the rim, and a tire attached so as to cover an outer peripheral surface of the wheel and including a pair of sidewall portions. A gauge of the sidewall portions is 1.5 mm or more.

4 Claims, 5 Drawing Sheets

(51) Int. Cl.
  *B60C 13/00* (2006.01)
  *H02J 50/10* (2016.01)
  *B60K 7/00* (2006.01)
(52) U.S. Cl.
  CPC ..... *B60B 2360/00* (2013.01); *B60C 2013/007* (2013.01); *B60K 7/0007* (2013.01)
(58) Field of Classification Search
  CPC ... B60B 19/00; B60C 13/00; B60C 2013/007; B60C 1/0025; B60C 2001/0066
  See application file for complete search history.

(56) References Cited

U.S. PATENT DOCUMENTS

| | | | |
|---|---|---|---|
| 6,719,029 | B2 | 4/2004 | Close |
| 8,008,888 | B2 | 8/2011 | Oyobe et al. |
| 8,662,221 | B2 * | 3/2014 | Ueno ................... B60L 9/00 180/65.51 |
| 10,207,541 | B2 | 2/2019 | Kuwayama et al. |
| 10,644,544 | B2 | 5/2020 | Kanno |
| 11,186,192 | B1 * | 11/2021 | Failing ................... B60L 53/60 |
| 2010/0225271 | A1 * | 9/2010 | Oyobe ................... B60L 50/61 320/108 |
| 2011/0031047 | A1 * | 2/2011 | Tarr ................... B60L 50/40 191/10 |
| 2014/0042752 | A1 * | 2/2014 | McDermott ........... H02K 7/006 310/67 R |
| 2014/0209228 | A1 | 7/2014 | Kuwayama et al. |
| 2015/0266385 | A1 * | 9/2015 | Lang ................... B60L 53/12 320/108 |
| 2017/0136895 | A1 * | 5/2017 | Ricci ................... B60C 19/00 |
| 2017/0291459 | A1 | 10/2017 | Kuwayama et al. |
| 2017/0297383 | A1 | 10/2017 | Hatanaka et al. |
| 2017/0305193 | A1 | 10/2017 | Kuwayama et al. |
| 2019/0084430 | A1 * | 3/2019 | Klinger ................... B60L 53/32 |
| 2020/0047562 | A1 | 2/2020 | Nemoto |
| 2020/0114766 | A1 * | 4/2020 | Javaid ................... B60L 53/38 |

FOREIGN PATENT DOCUMENTS

| | | | | |
|---|---|---|---|---|
| CN | 106715157 | A | | 5/2017 |
| CN | 106715158 | A | | 5/2017 |
| CN | 106794719 | A | | 5/2017 |
| CN | 108394237 | A * | 8/2018 | |
| DE | 19824290 | A1 * | 12/1999 | ............ B60L 11/182 |
| EP | 2196351 | A1 | | 6/2010 |
| JP | H08126106 | A | | 5/1996 |
| JP | 2001277824 | A | | 10/2001 |
| JP | 2004242380 | A | | 8/2004 |
| JP | 2005119543 | A | | 5/2005 |
| JP | 2006081304 | A | | 3/2006 |
| JP | 2008105544 | A | | 5/2008 |
| JP | 2009018716 | A | | 1/2009 |
| JP | 2009106136 | A | | 5/2009 |
| JP | 2010041824 | A | | 2/2010 |
| JP | 2010254044 | A | | 11/2010 |
| JP | 2018068077 | A | | 4/2018 |
| JP | 2018167831 | A | | 11/2018 |
| JP | 2019047691 | A | | 3/2019 |
| WO | WO-2017202787 | A1 * | 11/2017 | .......... B25J 19/0041 |
| WO | 2018193700 | A1 | | 10/2018 |

OTHER PUBLICATIONS

Jan. 25, 2022, International Preliminary Report on Patentability issued in the International Patent Application No. PCT/JP2020/028512.

Oct. 6, 2020, International Search Report issued in the International Patent Application No. PCT/JP2020/028512.

Jul. 25, 2023, search result of the Extended European Search Report issued by the European Patent Office in the corresponding European Patent Application No. 20843999.2.

* cited by examiner

TIRE/WHEEL ASSEMBLY AND TIRE

TECHNICAL FIELD

The present disclosure relates to a tire/wheel assembly and a tire.

BACKGROUND

Technology is known for a power transmission device installed in a road, a parking lot, or the like to supply electric power wirelessly to a power reception device mounted in a vehicle. For example, Patent Literature (PTL) 1 discloses a vehicle that includes a power reception device on the underside of the vehicle to enable charging by a power transmission device installed on a road surface.

CITATION LIST

Patent Literature

PTL 1: JP 2018-068077 A

SUMMARY

Technical Problem

However, when the power reception device installed on the underside of the vehicle disclosed in PTL 1 wirelessly receives a supply of electric power from a power transmission device installed on a road or the like, there is a risk that an obstacle such as metal or a small animal may enter the space between the power reception device and the power transmission device, thereby reducing the efficiency of the power reception device.

Therefore, it is an aim of the present disclosure to provide a tire/wheel assembly and a tire capable of improving the power receiving efficiency during wireless power supply.

Solution to Problem

A tire/wheel assembly according to the present disclosure includes a wheel including a disk and a rim, the wheel having a power reception device attached to an outer peripheral surface of the rim to receive electric power supplied wirelessly from farther outward in a radial direction of the wheel than the rim, and a tire attached so as to cover an outer peripheral surface of the wheel and including a pair of sidewall portions, a gauge of the sidewall portions being 1.5 mm or more.

A tire according to the present disclosure is the tire used in the aforementioned tire/wheel assembly and is attached so as to cover an outer peripheral surface of the wheel.

Advantageous Effect

According to the present disclosure, a tire/wheel assembly and a tire capable of improving the power receiving efficiency during wireless power supply can be provided.

DETAILED DESCRIPTION

Embodiments of the present disclosure are described below with reference to the drawings.

Figure 1:
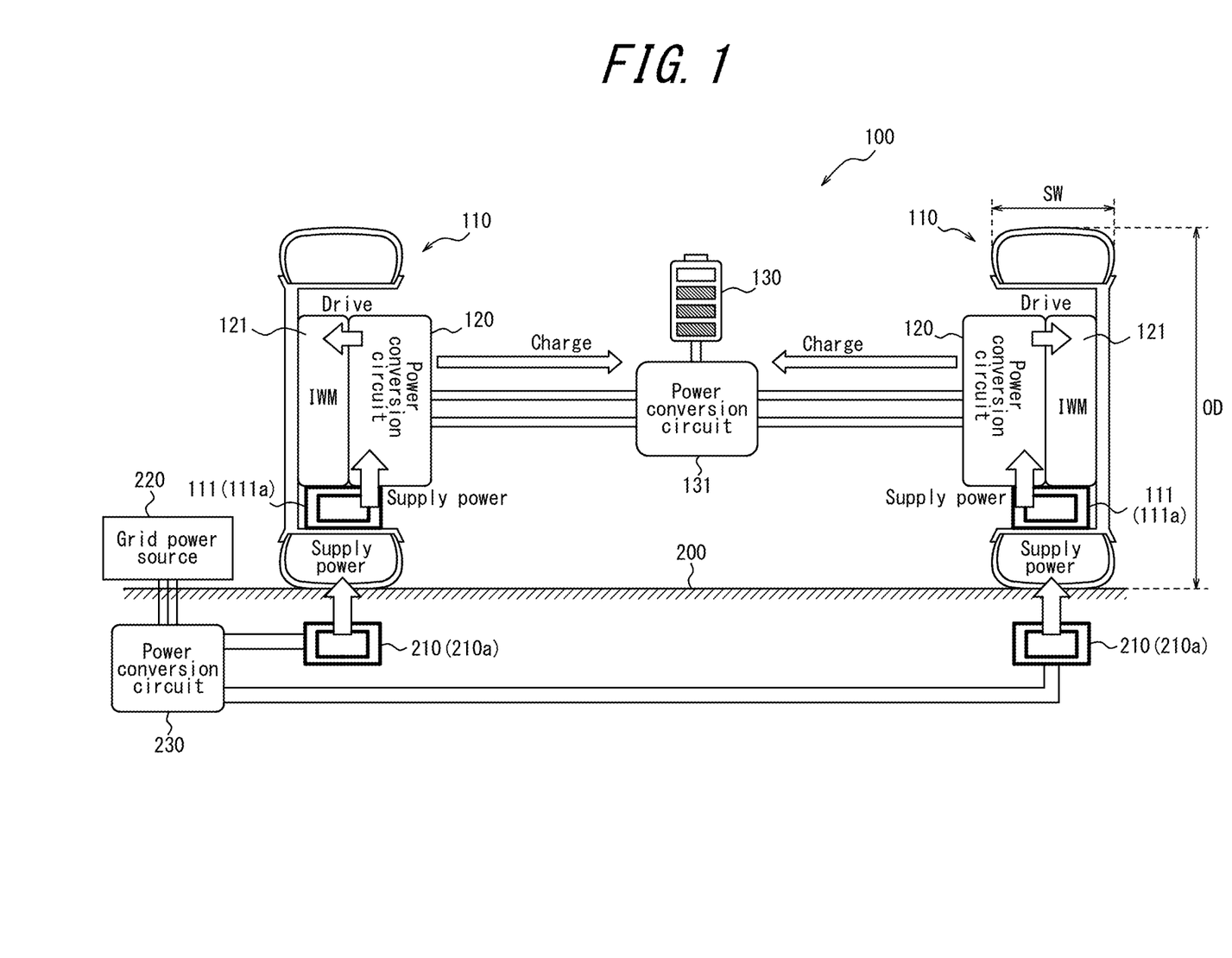
FIG. 1 is a conceptual diagram illustrating an example of a method of supplying power to a vehicle that includes a tire/wheel assembly according to the present disclosure.

FIG. 1 is a conceptual diagram illustrating a method of supplying power to a vehicle that includes a tire/wheel assembly according to the present disclosure. The power supply method described in the present specification can be applied to a vehicle 100, such as an electric vehicle, that uses electricity as an energy source and runs with an electric motor as a power source. Hereinafter, the vehicle 100 will be described as driving by autonomous operation, in which the driving of the vehicle is controlled by a computer.

For the sake of explanation, only the mechanisms associated with supplying power to the vehicle 100 are illustrated in FIG. 1. In the present embodiment, power is described as being supplied to the vehicle 100 by an electromagnetic induction method. The supply of power by the vehicle 100 with the electromagnetic induction method is described together with the configuration of the vehicle 100 with reference to FIG. 1.

The vehicle 100 includes tire/wheel assemblies 110. The vehicle 100 includes four tire/wheel assemblies 110, for example, but only two are illustrated in FIG. 1.

The vehicle 100 travels on a road surface 200. A power transmission device 210 is disposed inside the road surface 200, that is, underground. When the vehicle 100 receives a supply of electric power by the electromagnetic induction method, the power transmission device 210 is configured by a power transmission coil 210a. The power transmission device 210 is arranged in the road surface 200 with a width substantially equal to the width of the tire of the vehicle 100, i.e., the width between the left and right tire/wheel assemblies 110 attached to the vehicle 100. The power transmission device 210 is supplied with electric power outputted from a grid power source 220 via a power conversion circuit 230. For example, the voltage, current, frequency, or the like of the electric power outputted from the grid power source 220 is converted in the power conversion circuit 230, and the converted AC power is supplied to the power transmission device 210. By AC power being supplied to the power transmission device 210, a magnetic field is generated in the power transmission coil 210a.

The tire/wheel assembly 110 includes a power reception device 111. In FIG. 1, the position of the power reception device 111 is depicted for ease of explanation and does not indicate the exact position. When the vehicle 100 receives a supply of electric power by the electromagnetic induction method, the power reception device 111 is configured by a power reception coil 111a. By the vehicle 100 driving so that the tire/wheel assembly 110 is positioned above the power transmission coil 210a, an induced electromotive force is generated in a power reception coil 111a provided in the tire/wheel assembly 110 in response to the magnetic field generated by the power transmission coil 210a. In this way, the power reception device 111 can receive a supply of electric power via the power reception coil 111a. 35

That is, the power transmission device 210 supplies electric power to the power reception device 111 wirelessly by generating a magnetic field. In greater detail, the power reception device 111 is housed on the tire radial direction inner side of the tire/wheel assembly 110, and the vehicle 100 drives so that the contact patch of the tire/wheel assembly 110 passes over the power transmission device 210 provided in the road surface 200, or the vehicle 100 stops so that the contact patch of the tire/wheel assembly 110 is positioned over the power transmission device 210. Consequently, the power reception device 111 can receive electric power by a magnetic field generated substantially perpendicularly upwards from the power transmission device 210. At this time, since the tread portion of the tire/wheel assembly 110 is in contact with the road surface, the risk of obstacles coming between the power reception device 111 and the power transmission device 210 can be reduced, and thus the power receiving efficiency of the power reception device 111 during wireless power supply can be improved.

The tire/wheel assembly 110 is internally provided with a power conversion circuit 120 and an in-wheel motor (IWM) 121 as a drive mechanism for rotating the tire (internal mechanism). Electric power received by the power reception device 111 is supplied to the power conversion circuit 120, which is provided for each tire/wheel assembly 110, and is converted 20) into direct current (DC) electric power, for example. The electric power converted in the power conversion circuit 120 is supplied to the IWM 121 provided for each tire/wheel assembly 110. The IWM 121 is an electric motor for rotating the tire/wheel assembly 110 to drive the vehicle 100. The tire/wheel assembly 110 may be further provided internally with a capacitor used for charging with the electric power converted by the power conversion circuit 120.

Of the electric power converted by the power conversion circuit 120, the electric power not consumed by the IWM 121 may be supplied to and used to charge a vehicle-mounted battery 130 included in the vehicle 100. At this time, the electric power may be supplied to and used to charge the vehicle-mounted battery 130 via a power conversion circuit 131. The electric power used to charge the vehicle-mounted battery 130 is, for example, used to operate various devices in the vehicle 100.

Figure 2:
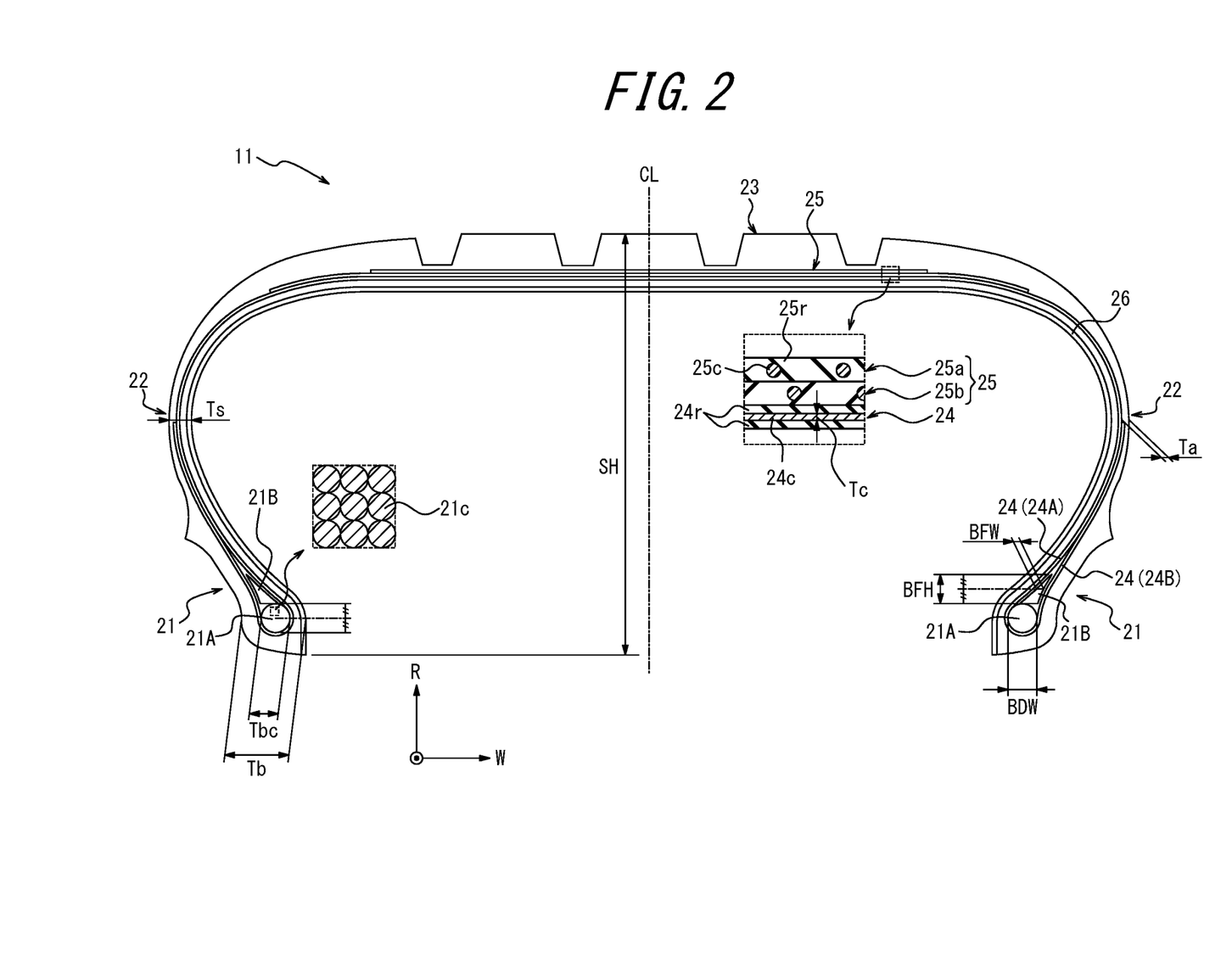
FIG. 2 is a cross-sectional view in the tire width direction, illustrating details of the tire of FIG. 1.

FIG. 2 illustrates a cross-sectional view of the tire 11 of FIG. 1 in the tire width direction, cut in a plane through the axis of rotation of the tire 11 along the tire width direction. In the present specification, the tire width direction refers to a direction parallel to the axis of rotation of the tire 11. In FIG. 2, the tire width direction is indicated by an arrow W. The tire radial direction refers to a direction orthogonal to the axis of rotation of the tire 11.

In FIG. 2, the tire radial direction is indicated by the arrow R. In the present embodiment, the tire 11 is described as having a symmetrical configuration with respect to the tire equatorial plane CL, but this example is not limiting. The tire 11 can have an asymmetrical configuration with respect to the tire equatorial plane CL.

In the present specification, the side closer to the axis of rotation of the tire 11 along the tire radial direction is referred to as the "tire radial inner side" or the "tire inner peripheral side", and the side farther from the axis of rotation of the tire 11 along the tire radial direction is referred to as the "tire radial outer side" or the "tire outer peripheral side". The side closer to the tire equatorial plane CL along the tire width direction is referred to as the "tire widthwise inner side", and the side farther from the tire equatorial plane CL along the tire width direction is referred to as the "tire widthwise outer side".

As illustrated in FIG. 2, the tire 11 includes a pair of bead portions 21, a pair of sidewall portions 22, each of which is continuous from a bead portion 21 outward in the tire radial direction, and a tread portion 23 between the pair of sidewall portions 22. The tread portion 23 is the tire widthwise portion between the pair of ground edges.

The tread portion 23 is, for example, formed only from a non-magnetic material. This can improve the power receiving efficiency as compared to if the tread portion 23 were to include a magnetic material (such as steel).

Since the tread portion 23 is located between the power transmission device 210 and the power reception device 111 during power reception (and hence at a position through which electric power (specifically, a magnetic field in the present embodiment) mainly passes), such optimization of the material of the tread portion 23 contributes greatly to improving the power receiving efficiency.

Non-magnetic materials include paramagnetic and diamagnetic materials with low magnetic permeability. Resin materials can be used as non-magnetic materials, examples of which include thermoplastic resins such as polyester and nylon, thermosetting resins such as vinyl ester resin and unsaturated polyester resins, and other synthetic resins. The resin material can further include fibers of glass, carbon, graphite, aramid, polyethylene, ceramic, and the like as reinforcing fibers. The non-magnetic material is not limited to resin, and any non-metallic material, including rubber, glass, carbon, graphite, aramid, polyethylene, and ceramic, can be used. Furthermore, a metallic material can be used as the non-magnetic material, including a paramagnetic material such as aluminum or a diamagnetic material such as copper.

The tire 11 includes a carcass 24. The carcass 24 extends in a toroidal shape between a pair of bead cores 21A and forms the framework of the tire. The end sides of the carcass 24 are engaged with the bead cores 21A. Specifically, the carcass 24 has a carcass body portion 24A disposed between the bead cores 21A and carcass folded-up portions 24B that are folded up from the tire widthwise inner side towards the tire widthwise outer side around the bead cores 21A. The length of the carcass folded-up portion 24B can be freely set. The carcass 24 can have a structure without the carcass folded-up portions 24B, or a structure in which the carcass folded-up portions 24B are wrapped around the bead cores 21A.

The carcass 24 can be configured by one or more carcass layers (one in the example of FIG. 2). For example, the carcass 24 can be configured by two carcass layers stacked in the tire radial direction at the tire equatorial plane CL. As illustrated in the partial enlargement in FIG. 2, each carcass layer includes one or more carcass cords 24c and a coating rubber 24r that coats the carcass cords 24c. The carcass cords 24c can be formed from monofilaments or twisted wires.

The carcass cords 24c are, for example, formed from a non-magnetic material. This can improve the power receiving efficiency as compared to if the carcass cords were formed from a magnetic material (such as steel). Alternatively, the carcass cords 24c may be formed from a non-magnetic material only in a portion of the carcass 24 including the portion forming the tread portion 23, and the remaining portion may be formed from a magnetic material.

Since the portion of the carcass 24 mainly forming the tread portion 23 is located between the power transmission device 210 and the power reception device 111 during power reception, such optimization of the material of the carcass 24 contributes greatly to improving the power receiving efficiency.

In the case in which the carcass cords 24*c* are formed from a non-magnetic material, the carcass cords 24*c* can be configured by any resin material, such as polyester, nylon, rayon, and aramid, as well as any other non-magnetic material.

The carcass 24 may have a radial structure or a bias structure. The carcass 24 may be integrally formed entirely from the above-described resin material or the like, without use of the carcass cords 24*c*. Furthermore, it is possible to form only a portion of the carcass 24, including the portion configuring the tread portion 23, from a non-magnetic material, with other portions being formed to include a magnetic material.

A belt 25 reinforcing the tread portion 23 is provided on the tire radial direction outer side of the carcass 24 in the tread portion 23. Tread rubber is provided on the outer periphery of the belt 25 in the tire radial direction.

The belt 25 can, for example, be formed by one or more (two in the example of FIG. 2) belt layers 25*a*, 25*b* stacked in the tire radial direction. As illustrated in the partial enlargement in FIG. 2, each of the belt layers 25*a*, 25*b* includes one or more belt cords 25*c* and a coating rubber 25*r* that coats the belt cords 25*c*. The belt cords 25*c* can be formed from monofilaments or twisted wires.

The belt cords 25*c* are, for example, formed from a non-magnetic material. This can improve the power receiving efficiency as compared to if the belt cords 25*c* were formed from a magnetic material (such as steel). Alternatively, the belt cords 25*c* may be formed from a non-magnetic material only in a portion of the belt 25 including the portion forming the tread portion 23, and the remaining portion may be formed from a magnetic material.

Since most or all of the belt 25 is located in the tread portion 23, between the power transmission device 210 and the power reception device 111 during power reception, such optimization of the material of the belt 25 contributes greatly to improving the power receiving efficiency. In the case in which the belt cords 25*c* are formed from a non-magnetic material, the belt cords 25*c* can be configured by any resin material, such as polyester, nylon, rayon, and aramid, as well as any other non-magnetic material.

The belt 25 may be integrally formed entirely from the above-described resin material or the like, without use of the belt cords 25*c*.

Furthermore, it is possible to form only a portion of the belt 25, including the portion configuring the tread portion 23, from a non-magnetic material, with other portions being formed to include a magnetic material.

The two bead portions 21 each include a bead core 21A and a bead filler 21B. As illustrated in the partial enlargement in FIG. 2, the bead core 21A is provided with a plurality of bead wires 21*c* surrounded by a rubber coating. The bead wires 21*c* can be formed from monofilaments or twisted wires. The bead fillers 21B are formed from rubber or the like and are positioned farther outward in the tire radial direction than the bead cores 21A. In the present embodiment, the thickness of the bead filler 21B decreases outward in the tire radial direction. However, the tire 11 can be structured without the bead fillers 21B. The bead portion 21 is configured to contact the rim on the inner side in the tire radial direction and the outer side in the tire width direction when the tire 11 is mounted on the rim. The bead portions 21 tend to be located farther outward in the tire width direction than the power transmission device 210 and the power reception device 111 during power reception and therefore have less effect on the power receiving efficiency than the tread portion 23.

Accordingly, good power reception can be achieved regardless of whether the bead wires 21*c* are formed from a non-magnetic material or magnetic material (such as steel).

In the case in which the bead wires 21*c* are formed from a non-magnetic material, the bead wires 21*c* can be configured by any resin material, such as polyester, nylon, rayon, and aramid, as well as any other non-magnetic material.

The sidewall portions 22 tend to be located farther outward in the tire width direction than the power transmission device 210 and the power reception device 111 during power reception and therefore have less effect on the power receiving efficiency than the tread portion 23.

Accordingly, good power reception can be achieved regardless of whether the sidewall portions 22 are formed only from a non-magnetic 35 material (such as rubber) or are formed to include a magnetic material.

Forming the sidewall portions 22 to include a magnetic material can suppress attenuation of the magnetic field transmitted from the power transmission device 210 to the power reception device 111 due to the influence of other magnetic fields and of metal that may exist outside the sidewall portions 22 in the tire width direction, thereby improving the power receiving efficiency.

An example of the magnetic material that can be included in the sidewall portions 22 is ferrite.

The tire 11 includes an inner liner 26. The inner liner 26 is disposed to cover the inner wall surface of the tire 11. The inner liner 26 can be configured by a plurality of inner liner layers stacked in the tire radial direction at the tire equatorial plane CL. The inner liner 26 is, for example, configured by a butyl-based rubber having low air permeability. Examples of butyl-based rubber include butyl rubber and butyl halide rubber, which is a derivative thereof. The inner liner 26 is not limited to butyl-based rubber and can be configured by other rubber compositions, resins, or elastomers.

Next, embodiments of the tire/wheel assembly 110 according to the present disclosure are described in detail with reference to the drawings.

First Embodiment

Figure 3:
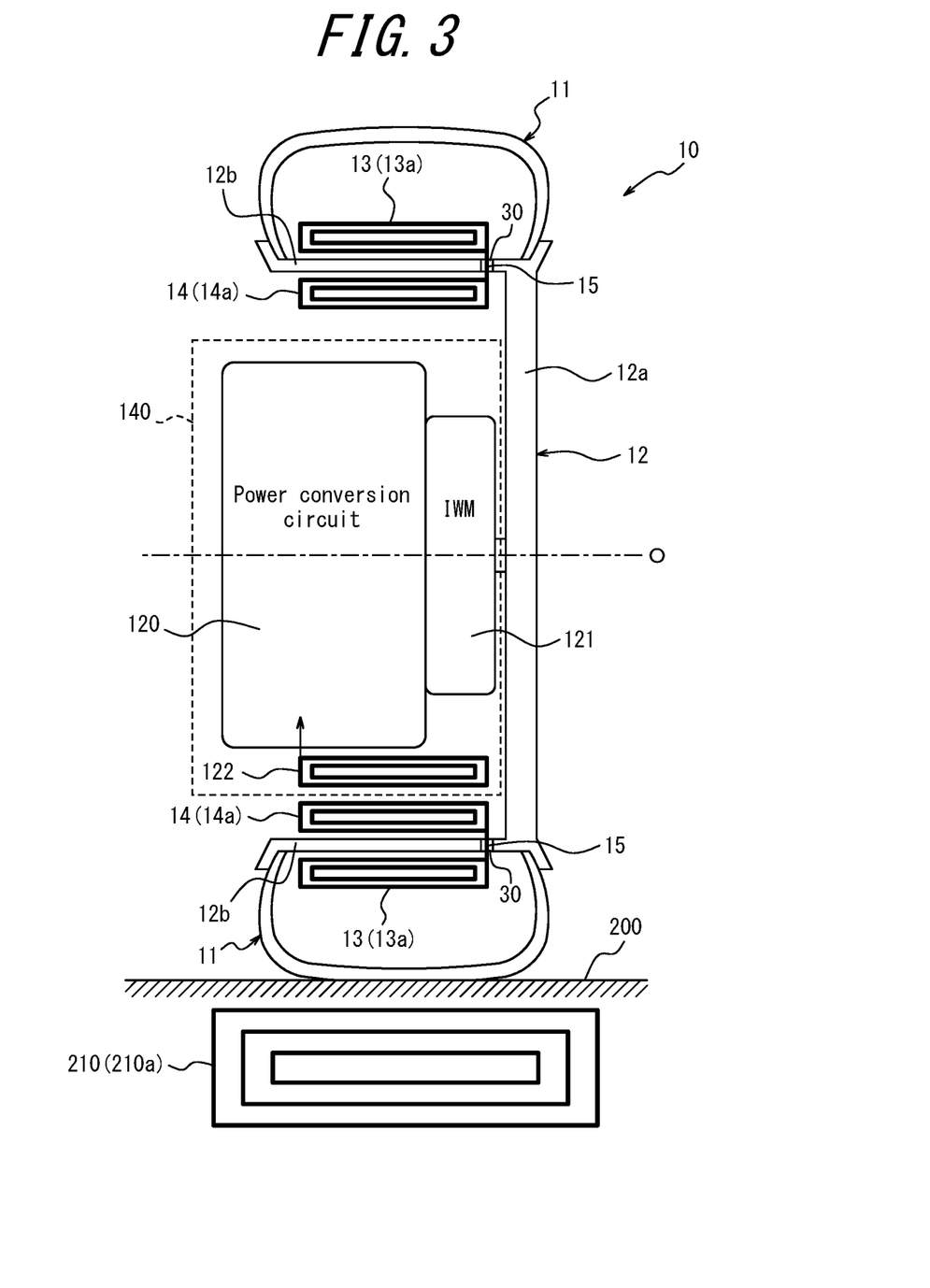
FIG. 3 is a schematic cross-sectional diagram illustrating the configuration of a tire/wheel assembly according to a first embodiment of the present disclosure.

FIG. 3 is a schematic cross-sectional diagram illustrating the configuration of a tire/wheel assembly according to a first embodiment of the present disclosure. The tire/wheel assembly 10 according to the first embodiment includes a tire 11, a wheel 12, and a power conversion circuit 120 and IWM 121 as an internal mechanism 140. In FIG. 3, a schematic cross-section of the tire 11 and the wheel 12 is illustrated. In FIG. 3, the power conversion circuit 120 and the IWM 121 are illustrated as functional blocks.

The wheel 12 includes a substantially discoid disk 12*a* and a rim 12*b* formed to be ring-shaped around a central axis O of the disk 12*a*.

As illustrated in FIG. 3, a power reception device 13 is attached to the wheel 12 on the radial outer surface around the central axis O (outer peripheral surface) at the rim 12*b*. The power reception device 13 is, for example, configured by a power reception coil 13*a*. The power reception coil 13*a* is attached to the rim 12*b* by, for example, being adhered to the outer peripheral surface of the rim 12*b*. The power reception coil 13*a* is formed to be ring-shaped and is attached to the rim 12*b* so that the axial direction of the ring (the direction perpendicular to the ring-shaped surface) faces the radial direction of the wheel 12 (the up-down direction in the cross-section of FIG. 3). However, in FIGS. 1 to 5, the direction of the ring-shaped surface of the power reception coil 13*a* is illustrated schematically and is not necessarily depicted precisely. The same holds for the power transmission coil 210*a* and the below-described relay coil 14*a* and internal power reception coil 122.

One or more of the power reception coils 13*a* may be attached along the periphery of the ring-shaped rim 12*b*. The number of power reception coils 13*a* attached to the rim 12*b* may be determined according to the required amount of received power, the specifications of the vehicle, and the like. The power reception device 13 receives electric power supplied wirelessly from farther outward in the radial direction of the wheel 12 than the rim 12*b*. In the present specification, "receiving electric power supplied wirelessly" includes not only the case in which the electric power itself is transmitted wirelessly from the outside and the power receiving side receives the electric power itself, but also the case in which electric power (current and/or voltage) is generated for the first time on the power receiving side by wireless action from the outside. Accordingly, "receiving electric power supplied wirelessly" includes receiving electric power supplied by an electromagnetic induction method, that is, the case of an electromotive force being generated for the first time on the power receiving side by the action of a magnetic field from the outside. In the present embodiment, the power reception device 13 can receive a supply of electric power with the power reception coil 13*a*, in a similar way to the power reception coil 111*a* described with reference to FIG. 1, by an induced electromotive force being generated in response to the magnetic field of the power transmission coil 210*a* provided on the road surface 200.

In the present embodiment, the electric power received by the power reception device 13 from the power transmission device 210 may be transmitted to the power conversion circuit 120 via a relay device 14. In the present embodiment, the relay device 14 is configured by a relay coil 14*a*. In the example illustrated in FIG. 3, the relay coil 14*a* is attached to the surface of the rim 12*b* on the tire radial inner side (inner peripheral surface). The relay coil 14*a* may be attached in one-to-one correspondence to the power reception coil 13*a*. In other words, the same number of power reception coils 13*a* and relay coils 14*a* may be attached to the rim 12*b*.

The power reception coil 13*a* and the relay coil 14*a* are connected to metal wiring 15. The electric power generated by the power reception coil 13*a* is transmitted to the relay coil 14*a* via the metal wiring 15. The electric power generated in the power reception coil 13*a* is supplied to the relay coil 14*a*, thereby generating a magnetic field in the relay coil 14*a*. 5

In the present embodiment, the rim 12*b* has a through hole 30 through which the metal wiring 15 is passed to transmit the electric power generated in the power reception coil 13*a* to the tire radial inner side (i.e., the inner peripheral side) of the rim 12*b*. In the present embodiment, the rim 12*b* May be made of metal or be non-metallic (for example, made of resin). That is, in the present embodiment, the power reception coil 13*a* is disposed on the outer peripheral surface of the rim 12*b*, and hence even if the rim 12*b* is made of metal, in particular a magnetic metal, the magnetic field generated in the power transmission coil 210*a* is not obstructed, and the power reception coil 13*a* more efficiently receives power.

As illustrated in FIG. 3, the tire/wheel assembly 10 further includes the internal power reception coil 122 as the internal mechanism 140. The internal power reception coil 122 generates an induced electromotive force in response to the magnetic field generated by the relay coil 14*a*. In this way, the internal power reception coil 122 can indirectly receive electric power supplied from the power transmission coil 210*a* via the relay coil 14*a*. The internal power reception coil 122 supplies the received electric power to the power conversion circuit 120. In the power conversion circuit 120, the received electric power is converted into DC electric power and is consumed by the vehicle that includes the tire/wheel assembly 10. The tire/wheel assembly 10 illustrated in FIG. 3 need not include the relay device 14 and the metal wiring 15. In this case, the rim 12*b* is preferably made of a non-magnetic material, and in particular is preferably non-metallic (for example, made of resin). In this case, the electric power received by the power reception coil 13*a* is transmitted to the internal power reception coil 122 without passing through the relay device 14.

The tire 11 is attached to the wheel 12 so as to cover the outer peripheral surface of the wheel 12. Details of the tire 11 are as described with reference to FIG. 2. At least the tread portion of the tire 11 does not contain any magnetic material and is formed from a non-magnetic material. The tire 11 may be configured as a "steel-less tire" that does not contain steel. As a result, the magnetic field generated in the power transmission coil 210*a* is not obstructed by the tread portion, and the power reception coil 13*a* can efficiently receive electric power from the power transmission coil 210*a*.

In this way, according to the tire/wheel assembly 10 of the present embodiment, electric power can be received wirelessly by the power reception device 13 attached to the outer peripheral surface of the rim 12*b* from the power transmission device 210 located farther outward in the radial direction of the wheel 12 than the rim 12*b*. The electric power received by the power reception device 13 can be transmitted to the internal mechanism 140 via the relay device 14. The tire/wheel assembly 10 can thus receive a power supply from the road surface 200. At this time, since the tread portion of the tire/wheel assembly 110 is in contact with the road surface, the risk of obstacles coming between the power reception device 13 and the power transmission device 210 can be reduced, and thus the power receiving efficiency of the power reception device 13 during wireless power supply can be improved.

In the tire/wheel assembly 10 according to the present embodiment, since the rim 12*b* may be made of metal (such as steel or aluminum), a known metal wheel that can be mass-produced may be used as the wheel 12. An increase in the cost of the wheel 12 used in the tire/wheel assembly 10 according to the present embodiment can thereby be suppressed.

Second Embodiment

Figure 4:
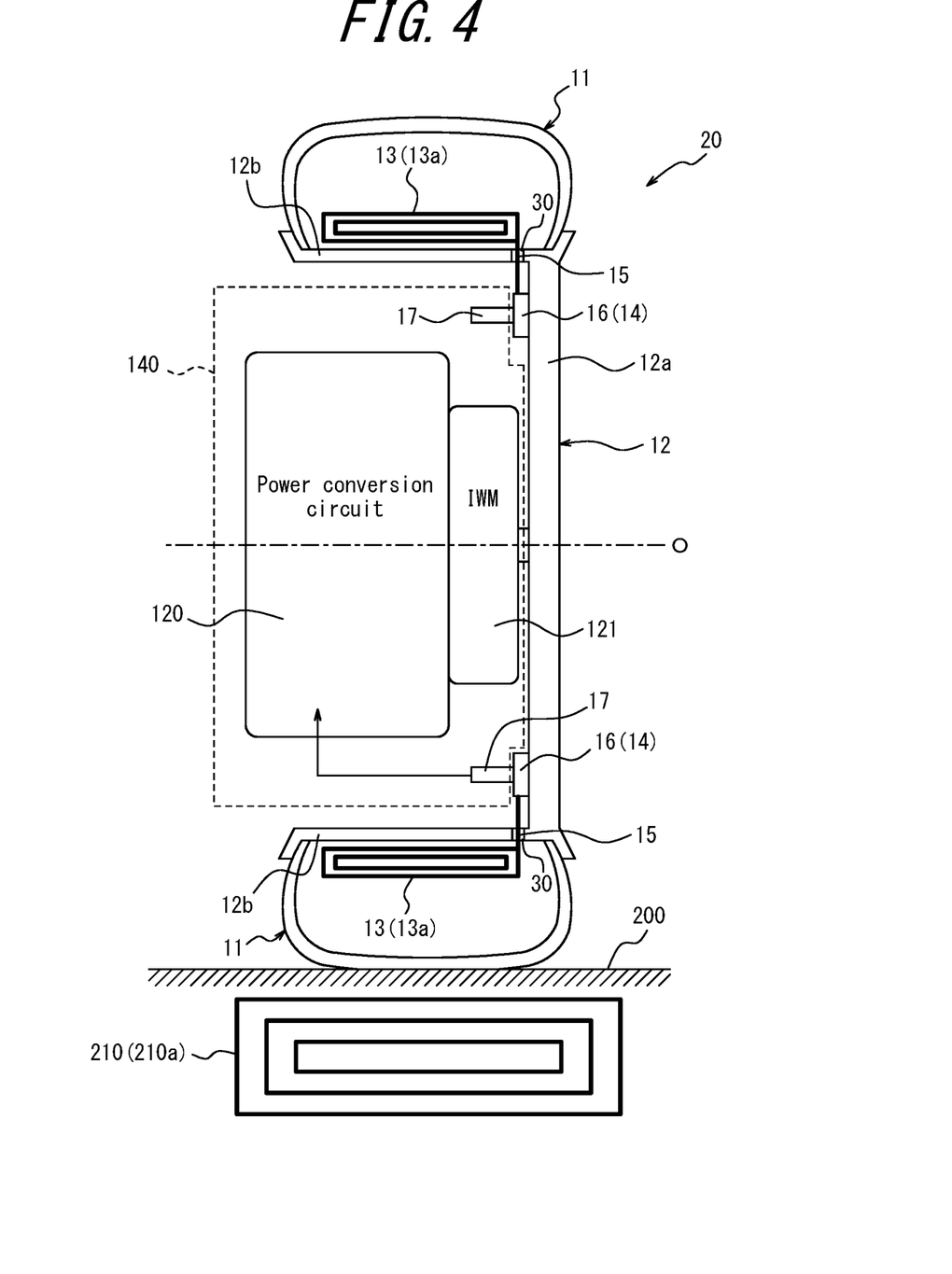
FIG. 4 is a schematic cross-sectional diagram illustrating the configuration of a tire/wheel assembly according to a second embodiment of the present disclosure.

FIG. 4 is a schematic cross-sectional diagram illustrating the configuration of a tire/wheel assembly according to a second embodiment of the present disclosure. Like the tire/wheel assembly 10 according to the first embodiment, a tire/wheel assembly 20 according to the second embodiment includes a tire 11, a wheel 12, and a power conversion circuit 120 and IWM 121 as an internal mechanism 140. In FIG. 4, a schematic cross-section of the tire 11 and the wheel 12 is illustrated. In FIG. 4, the power conversion circuit 120 and the IWM 121 are illustrated as functional blocks.

The tire/wheel assembly 20 according to the second embodiment differs from the tire/wheel assembly 10 according to the first embodiment in that a slip ring is used as the relay device 14 instead of the relay coil 14*a* and the internal power reception coil 122. The tire/wheel assembly 20 according to the second embodiment will now be described while omitting, as appropriate, an explanation of matter shared in common with the tire/wheel assembly 10 according to the first embodiment. In the present embodiment, components in common with the first embodiment are labeled with the same reference signs.

In the present embodiment, as in the first embodiment, a power reception device 13 is attached to the wheel 12 on the outer peripheral surface around the central axis O at the rim 12*b*.

In the present embodiment, unlike the first embodiment, the electric power received by the power reception coil 13*a* from the power transmission coil 210*a* is transmitted to the internal mechanism 140 using a slip ring. A known slip ring with a metal ring and brush may be used as the slip ring. A ring 16 serving as a relay device 14 and configuring the slip ring is fixed to the wheel 12, as illustrated in FIG. 4. For example, the ring 16 is fixed to the side of the disk portion 12*a* on which the internal mechanism 140 is provided. The ring 16 may be disposed so as to be coaxial with the central axis O of the disk portion 12*a*. On the other hand, the brush 17 configuring the slip ring is fixed to the internal mechanism 140. The brush 17 is electrically connected to the power conversion circuit 120. The brush 17 is disposed at a position where it rubs against the ring 16 when the tire 11 rotates.

The power reception coil 13*a* and the ring 16 are connected to metal wiring 15. As a result, the electric power generated by the power reception coil 13*a* is transmitted to the ring 16 via the metal wiring 15 and is further supplied from the ring 16 to the power conversion circuit 120 via the brush 17. The metal wiring 15 connects the power reception device 13 to the ring 16 through a through hole 30 provided in the rim 12*b*, as in the first embodiment.

In the present embodiment, unlike the first embodiment, the electric power received by the power reception coil 13*a* is thus transmitted to the internal mechanism 140 using a slip ring that includes the ring 16 and the brush 17. The tire/wheel assembly 20 according to the present embodiment also enables electric power to be received from the power transmission coil 210*a* by the power reception device 13 attached to the outer peripheral surface of the rim 12*b*. The electric power received by the power reception device 13 can be transmitted to the internal mechanism 140 via the slip ring. As a result, the tire/wheel assembly 20 as well can receive a power supply from the road surface 200. At this time, using the same principle as in the first embodiment, the power receiving efficiency during wireless power supply of the power reception device 13 can be improved.

In the tire/wheel assembly 20 according to the present embodiment as well, since the rim 12*b* may be made of metal (such as steel or aluminum), a known metal wheel that can be mass-produced may be used as the wheel 12, 5 thereby suppressing an increase in costs.

In the above embodiments, when the rim 12*b* is formed from a non-magnetic material (such as resin), wiring that electrically connects the electric power received by the power reception coil 13*a* to the relay coil 14*a* or the ring 16 on the inner peripheral side can be configured inside the rim 12*b* that is made of the non-magnetic material. In this case, the wheel 12 can be reduced in weight. For example, compared to a wheel made of magnetic metal, a wheel made of resin can be reduced in weight.

In the above embodiments, the power reception device 13 is described as being fixed to the rim 12*b*. However, the power reception device 13 does not necessarily have to be fixed to the rim 12*b*. For example, the power reception device 13 may be attached to a core that is attached to the wheel 12 inside the tire 11.

Figure 5:
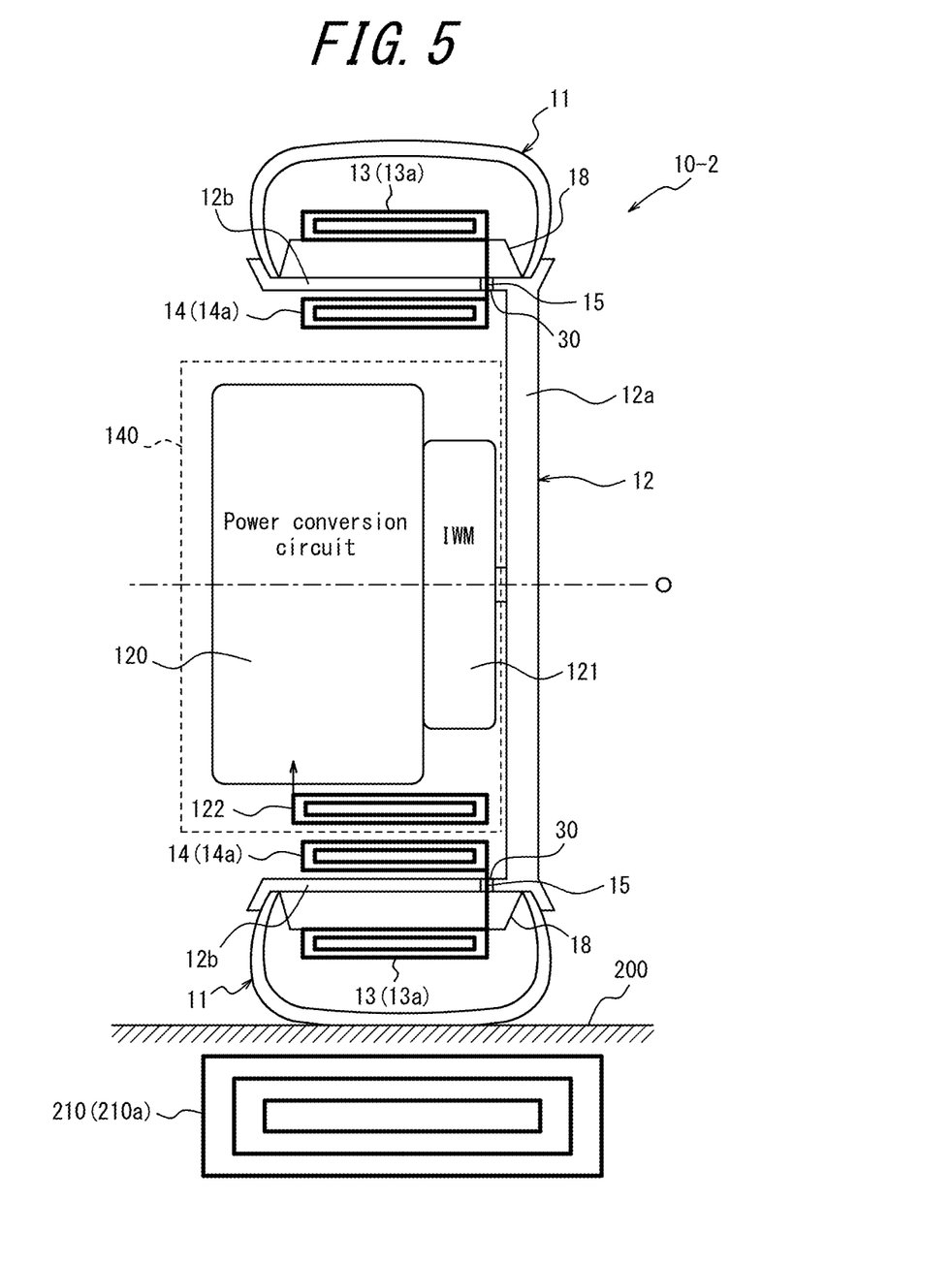
FIG. 5 is a variation of the tire/wheel assembly of FIG. 3.

FIG. 5 is a variation of the tire/wheel assembly 10 of FIG. 3. FIG. 5 is a diagram illustrating the tire/wheel assembly 10-2 in which the power reception device 13 is attached to a core 18. The core 18 is a ring-shaped member and is attached along the outer peripheral surface of the rim 12*b*. The core 18 may, for example, be made of metal or be non-metallic (for example, made of resin). In the present variation, the power reception device 13 is attached to the outer peripheral surface of the core 18. The remaining structure is similar to that of FIG. 3.

In this way, even when the power reception device 13 is attached to the core 18 as in the present embodiment, the power reception device 13 can receive electric power transmitted from the power transmission device 210 disposed on the road surface 200. Additionally, when the core 18 is used as in the present embodiment, the distance from the power transmission device 210 is less than when the core 18 is not used, thereby facilitating reception of electric power.

Although FIG. 5 illustrates the tire/wheel assembly 10-2 which is a variation of the tire/wheel assembly 10 of FIG. 3, a similar configuration is applicable to the tire/wheel assembly 20 of FIG. 4. In other words, the configuration to attach the power reception device 13 to the outer peripheral surface of the core 18 is also applicable to the tire/wheel assembly 20 in which electric power is transmitted to the internal mechanism 140 by the slip ring.

In the above embodiments, examples of electric power being wirelessly transmitted to the vehicle 100 by an electromagnetic induction method have been described, but the method of transmitting electric power is not limited to the electromagnetic induction method. For example, electric power may be wirelessly transmitted by an electric field coupling method. In this case, for example, an electrode serving as a power transmission device on the power transmission side is embedded in the road surface 200, and an electrode serving as a power reception device on the power receiving side is attached to the rim 12*b* of the wheel assembly or to the core 18 attached to the rim 12*b* of the wheel assembly. A capacitor is formed when the electrode on the power transmitting side and the electrode on the power receiving side face each other. Therefore, when electric power is supplied to the electrode on the power transmitting side, electric power is also generated in the electrode on the power receiving side, and electric power can thereby be transmitted. In this case, it is preferable that at least the tread portion of the tire 11 is non-metallic, without containing any metal material.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the components and the like may be reordered in any logically consistent way. Furthermore, components may be combined into one or divided.

In the present disclosure, the ratio SW/OD of the cross-sectional width SW to the outer diameter OD of the tire is 0.26 or less in the case in which the cross-sectional width SW of the tire is less than 165 (mm), and the cross-sectional width SW (mm) and the outer diameter OD (mm) of the tire preferably satisfy the following relational expression (Relational Expression (1)) in the case in which the cross-sectional width SW of the tire is 165 (mm) or more.

OD (mm)≥2.135×SW (mm)+282.3 (mm)

By the ratio SW/OD or Relational Expression (1) being satisfied, the cross-sectional width SW of the tire becomes relatively small in relation to the outer diameter OD of the tire, thereby reducing air resistance. The narrower cross-sectional width secures vehicle space, in particular space for installation of drive components near the vehicle-installed inside of the tire. Furthermore, by the ratio SW/OD or Relational Expression (1) being satisfied, the outer diameter of the tire becomes relatively large in relation to the cross-sectional width SW of the tire, thereby reducing rolling resistance. The wheel axle also becomes higher due to the larger diameter of the tire, expanding the space under the floor and thereby securing space for the trunk and the like of the vehicle and space for installation of drive components.

As described above, by the ratio SW/OD or Relational Expression (1) being satisfied, high fuel efficiency can be achieved for the supplied electrical energy, and a large amount of vehicle space can also be secured.

In the present disclosure, the cross-sectional width SW (mm) and the outer diameter OD (mm) of the tire also preferably satisfy the following relational expression (Relational Expression (2)).

OD (mm)≥−0.0187×SW (mm)$^2$+9.15×SW (mm)−380 (mm)

By Relational Expression (2) being satisfied, the cross-sectional width SW of the tire becomes relatively small in relation to the outer diameter OD of the tire, thereby reducing air resistance. The narrower cross-sectional width also secures vehicle space, in particular space for installation of drive components near the vehicle-installed inside of the tire.

Furthermore, by Relational Expression (2) being satisfied, the outer diameter of the tire becomes relatively large in relation to the cross-sectional width SW of the tire, thereby reducing rolling resistance. The wheel axle also becomes higher due to the larger diameter of the tire, expanding the space under the floor and thereby securing space for the trunk and the like of the vehicle and space for installation of drive components.

As described above, by Relational Expression (2) being satisfied, high fuel efficiency can be achieved for the supplied electrical energy, and a large amount of vehicle space can also be secured.

In the present disclosure, the tire preferably satisfies the ratio SW/OD and/or Relational Expression (2), or satisfies Relational Expression (1) and/or Relational Expression (2).

In each of the above examples, the tire 11 preferably satisfies the ratio SW/OD and/or Relational Expression (2), or satisfies Relational Expression (1) and/or Relational Expression (2), in the case in which the internal pressure is 250 kPa or more.

In each of the above examples, the tire 11 is preferably used at an internal pressure of 250 kPa or more. In this case, in particular when the internal pressure is 250 kPa or more, the tire 11 preferably satisfies the ratio SW/OD and/or Relational Expression (2), or satisfies Relational Expression (1) and/or Relational Expression (2). Both the tire rolling resistance and the tire weight can thereby be reduced. Consequently, a good power supply efficiency and high fuel efficiency can both be achieved.

In each of the above examples, the tire 11 is preferably configured so that the cross-sectional area of the bead filler 21B in the tire width direction is one or more times and eight or less times the cross-sectional area of the bead core 21A in the tire width direction. A good power supply efficiency and high fuel efficiency can both thereby be achieved.

In the case of a sandwiched bead core structure in which the carcass is held from the tire widthwise inner and outer sides, the total volume of the bead cores on the widthwise inner and outer sides of the carcass can be used in addition to the cross-sectional area in the tire width direction.

By the cross-sectional area of the bead filler 21B in the tire width direction being set to the above range, the volume of the bead filler, which is a highly rigid member, can be reduced to reduce the longitudinal spring coefficient of the tire and improve ride comfort. In addition, the bead filler can be made lighter to reduce the weight of the tire, thereby further reducing the tire rolling resistance.

In particular, in a narrow width and large diameter tire that satisfies Relational Expression (1) or Relational Expression (2), the tension rigidity of the belt is high, and the tension rigidity of the tire side portions is low compared to the belt. Setting the cross-sectional area of the bead filler 21B in the tire width direction to a predetermined range as described above is therefore extremely effective for reducing the longitudinal spring coefficient.

Here, if the cross-sectional area of the bead filler 21B in the tire width direction is more than eight times the cross-sectional area of the bead core 21A in the tire width direction, the volume of the bead filler, which is a highly rigid member, grows large, and the longitudinal spring coefficient of the tire is not sufficiently reduced. This may result in a decrease in ride comfort.

On the other hand, if the cross-sectional area of the bead filler 21B in the tire width direction is less than the cross-sectional area of the bead core 21A in the tire width direction, the rigidity of the bead portion may significantly decrease, and the transverse spring coefficient may be reduced too much to secure steering stability.

In the tire 11 of each of the above examples, the following relational expression is preferably satisfied, where BFW (FIG. 2) is the width in the tire width direction at a central position of the bead filler 21B in the tire radial direction, and BDW (FIG. 2) is the maximum width in the tire width direction of the bead core 21A.

0.1≤BFW/BDW≤0.6

A good power supply efficiency and high fuel efficiency can both thereby be achieved.

By the ratio BFW/BDW being set to 0.6 or less, the volume of the bead filler is reduced while maintaining the bead filler height. This secures rigidity in the tire rotation direction while reducing the longitudinal spring coefficient to improve ride comfort, and can also reduce the weight of the tire.

On the other hand, by the ratio BFW/BDW being set to 0.1 or more, the rigidity of the bead portion 21 can be secured, the transverse spring coefficient can be maintained, and the steering stability can be further secured.

In the tire 11 of each of the above examples, the following relational expression is preferably satisfied, where BFH (FIG. 2) is the height of the bead filler 21B in the tire radial direction, and SH (FIG. 2) is the sectional height of the tire (tire section height).

0.1≤BFH/SH≤0.5

A good power supply efficiency and high fuel efficiency can both thereby be achieved.

By the ratio BFH/SH being set to 0.5 or less, the radial height of the bead filler, which is a highly rigid member, can be decreased to effectively reduce the longitudinal spring coefficient of the tire and improve ride comfort.

On the other hand, by the ratio BFH/SH being set to 0.1 or more, the rigidity of the bead portion 21 can be secured, the transverse spring coefficient can be maintained, and the steering stability can be further secured.

Here, the tire sectional height SH refers to ½ of the difference between the outer diameter of the tire and the rim diameter in a state with no load when the tire is mounted on the rim and filled to the internal pressure specified for each vehicle on which the tire is mounted.

The height BFH (FIG. 2) of the bead filler 21B in the tire radial direction is preferably 45 mm or less. A good power supply efficiency and high fuel efficiency can both thereby be achieved.

In each of the above examples, the tire 11 is preferably configured so that the ratio Ts/Tb of the gauge Ts (FIG. 2) of the sidewall portion 22 at the tire maximum width portion to the bead width Tb (width of the bead portion 21 in the tire width direction, FIG. 2) at the center position of the bead core 21A in the tire radial direction is 15% or more and 60% or less. A good power supply efficiency and high fuel efficiency can both thereby be achieved.

The "tire maximum width portion" refers to the maximum width position in a tire widthwise cross-section when the tire is mounted on the rim and is under no load.

The gauge Ts is the total thickness of all of the members, such as the rubber, the reinforcement member, and the inner liner.

In the case of a structure in which the bead core is divided into a plurality of small bead cores by the carcass, Tb may be the distance between the widthwise innermost end and outermost end of all of the small bead cores.

By the ratio Ts/Tb being set to the above range, the rigidity at the tire maximum width portion, where bending deformation is large when the tire is under a load, can be appropriately decreased to reduce the longitudinal spring coefficient and improve ride comfort.

That is, if the ratio Ts/Tb is more than 60%, the gauge of the sidewall portion 22 at the tire maximum width portion increases, and the sidewall portion 22 becomes more rigid, which may result in a higher longitudinal spring coefficient. On the other hand, if the ratio Ts/Tb is less than 15%, the transverse spring coefficient may be reduced too much to secure the steering stability.

In each of the above examples, the tire 11 is preferably configured so that the gauge Ts (FIG. 2) of the sidewall portion 22 at the tire maximum width portion is 1.5 mm or more. A good power supply efficiency and high fuel efficiency can both thereby be achieved.

By the gauge Ts being 1.5 mm or more, the rigidity at the tire maximum width portion can be maintained at an appropriate level to suppress a reduction in the transverse spring coefficient and to further secure the steering stability.

In each of the above examples, the tire 11 is preferably configured so that the diameter Tbc (maximum width in the tire width direction of the bead core in the present example, FIG. 2) of the bead core 21A is 3 mm or more and 16 mm or less. A good power supply efficiency and high fuel efficiency can both thereby be achieved.

A diameter Tbc of 3 mm or more can achieve a reduction in weight while ensuring bending rigidity and torsional rigidity on the rim flange, whereas a diameter Tbc of 16 mm or less can achieve steering stability while suppressing an increase in weight.

In each of the above examples, the tire 11 is preferably configured so that the footprint area of the tire 11 is 8,000 $mm^2$ or more when the tire 11 is under the maximum load specified for each vehicle on which the tire is mounted. This can achieve both a reduction in the tire rolling resistance and a reduction in the weight of the tire, thereby achieving both good power supply efficiency and high fuel efficiency. In addition, the tire axial force can be secured to improve the stability and safety of the vehicle.

In each of the above examples, the tire 11 is preferably configured so that the Young's modulus of the belt cord 25c is 40,000 MPa or more. This can optimize the carcass structure and the belt rigidity to ensure a tire strength that enables use even at high internal pressure. Furthermore, a good power supply efficiency and high fuel efficiency can both be achieved.

In each of the above examples, the tire 11 is preferably configured so that the thickness of the inner liner 26 is 0.6 mm or more. This can suppress air leakage in a high internal pressure state. Furthermore, a good power supply efficiency and high fuel efficiency can both be achieved.

In each of the above examples, the tire 11 is preferably configured so that the ratio Ts/Tc of the gauge Ts (FIG. 2) of the sidewall portion 22 at the 35 tire maximum width portion to the diameter Tc (FIG. 2) of the carcass cord 24c is 4 or more and 12 or less. A good power supply efficiency and high fuel efficiency can both thereby be achieved.

By the ratio Ts/Tc being set to the above range, the rigidity at the tire maximum width portion, where bending deformation is large when the tire is under a load, can be appropriately decreased to reduce the longitudinal spring 5 coefficient and improve ride comfort.

That is, if the ratio Ts/Tc is more than 12, the gauge Ts of the sidewall portion 22 at the tire maximum width portion increases, increasing the rigidity of this portion, which may result in a higher longitudinal spring coefficient. On the other hand, if the ratio Ts/Tc is less than 4, the transverse spring coefficient may be reduced too much to secure the steering stability.

In each of the above examples, the tire 11 is preferably configured so that the ratio Ta/Tc of the distance Ta (FIG. 2) to the diameter Tc (FIG. 2) of the carcass cord 24c is 2 or more and 8 or less, where Ta is the distance in the tire width direction from the surface of the carcass cord 24c to the tire outer surface at the tire maximum width portion. A good power supply efficiency and high fuel efficiency can both thereby be achieved.

By the ratio Ta/Tc being set to 8 or less, the gauge Ts of the sidewall portion 22 at the tire maximum width portion can be decreased to reduce the rigidity of the sidewall portion 22, thereby reducing the longitudinal spring coefficient and further improving ride comfort. On the other hand, by the ratio Ta/Tc being set to 2 or more, the transverse spring coefficient can be secured to further secure the steering stability.

Note that Ta (FIG. 2) refers to the distance in the tire width direction from the surface of the widthwise outermost carcass cord 24c to the tire outer surface at the tire maximum width portion.

That is, when the carcass folded portion 24B extends radially farther outward than the tire maximum width portion, Ta is the distance in the tire width direction from the surface of the carcass cord 24c at the portion forming the carcass folded-up portion 24B to the tire outer surface.

In each of the above examples, the tire 11 is preferably configured so that the diameter Tc (FIG. 2) of the carcass cord 24c is 0.2 mm or more and 1.2 mm or less. A good power supply efficiency and high fuel efficiency can both thereby be achieved.

By the diameter Tc being set to 1.2 mm or less, the gauge Ts of the sidewall portion 22 can be made smaller relative to the carcass cord diameter Tc, thereby reducing the longitudinal spring coefficient, whereas by the diameter Tc being set to 0.2 mm or more, the gauge Ts of the sidewall portion 22 can be secured relative to the carcass cord diameter Tc, thereby increasing the transverse spring coefficient to secure the steering stability.

REFERENCE SIGNS LIST 10, 10-2, 20, 110 Tire/wheel assembly
11 Tire
12 Wheel
12a Disk
12b Rim
13, 111 Power reception device
13a, 111a Power reception coil (power reception device)
14 Relay device
14a Relay coil (relay device)
15 Metal wiring
16 Ring (relay device)
17 Brush
18 Core
21 Bead portion
21A Bead core
21B Bead filler
21c Bead wire
22 Sidewall portion
23 Tread portion
24 Carcass
24A Carcass body portion
24B Carcass folded-up portion
24c Carcass cord
24r, 25r Coating rubber
25 Belt
25a Belt layer
25c Belt cord
26 Inner liner
30 Through hole
100 Vehicle
120, 131, 230 Power conversion circuit
121 In-wheel motor (IWM)
122 Internal power reception coil
130 Vehicle-mounted battery
140 Internal mechanism
200 Road surface
210 Power transmission device
210a Power transmission coil (power transmission device)
220 Grid power source
O Central axis
SW Cross-sectional width
OD Outer diameter

The invention claimed is:

1. A tire/wheel assembly comprising:
a wheel comprising a disk and a rim;
wherein the wheel includes a power reception device attached to an outer peripheral surface of the rim to receive electric power supplied wirelessly from farther outward in a radial direction of the wheel than the rim; and
a tire attached so as to cover an outer peripheral surface of the wheel and comprising a tread portion and a pair of sidewall portions;
wherein a gauge of the sidewall portions is 1.5 mm or more,
the tread portion is formed only of a non-magnetic material and the pair of the sidewall portions comprises a magnetic material,
the tire/wheel assembly further comprises a relay coil disposed on an inner peripheral surface of the rim,
the rim comprises a through hole for wiring that electrically connects the power reception device and the relay coil to transmit the electric power received by the power reception device to the relay coil,
the relay coil is configured to transmit the electric power inward in the radial direction of the wheel, and
the wheel further includes an internal power reception coil positioned inward of the relay coil in the radial direction of the wheel, the internal power reception coil being configured to receive the electric power supplied wirelessly from the relay coil.

2. The tire/wheel assembly of claim 1, wherein the rim is formed of a non-magnetic material.

3. The tire/wheel assembly of claim 1, wherein the power reception device is configured to receive electric power supplied by an electromagnetic induction method.

4. A tire/wheel assembly comprising:
a wheel comprising a disk and a rim;
wherein the wheel includes
a core attached to an outer peripheral surface of the rim; and
a power reception device attached to an outer peripheral surface of the core to receive electric power supplied wirelessly from farther outward in a radial direction of the wheel than the core; and
a tire attached so as to cover an outer peripheral surface of the wheel and comprising a tread portion and a pair of sidewall portions;
wherein a gauge of the sidewall portions is 1.5 mm or more,
the tread portion is formed only of a non-magnetic material and the pair of the sidewall portions comprises a magnetic material,
the tire/wheel assembly further comprises a relay coil disposed on an inner peripheral surface of the rim,
the rim comprises a through hole for wiring that electrically connects the power reception device and the relay coil to transmit the electric power received by the power reception device to the relay coil,
the relay coil is configured to transmit the electric power inward in the radial direction of the wheel, and
the wheel further includes an internal power reception coil positioned inward of the relay coil in the radial direction of the wheel, the internal power reception coil being configured to receive the electric power supplied wirelessly from the relay coil.

* * * * *